United States Patent [19]

Paulson et al.

[11] Patent Number: 4,499,992
[45] Date of Patent: Feb. 19, 1985

[54] SELF-CLEANING SUPPORT ROLLER FOR AN ENDLESS CONVEYOR BELT

[75] Inventors: Bernard S. Paulson, Clear Lake; Bruce H. Paulson, Clayton; Brian K. Clark; Richard A. Briesemeister, both of Clear Lake, all of Wis.

[73] Assignee: Pixall Corporation, Clear Lake, Wis.

[21] Appl. No.: 486,251

[22] Filed: Apr. 18, 1983

[51] Int. Cl.³ .............................................. B65G 45/00
[52] U.S. Cl. .................................... 198/498; 198/840
[58] Field of Search ....................... 198/498, 840, 842; 15/256.5

[56] References Cited

U.S. PATENT DOCUMENTS

| | | | |
|---|---|---|---|
| 207,626 | 9/1878 | Sargent | 198/840 |
| 1,299,324 | 4/1919 | Goodykoontz | 198/498 |
| 2,109,123 | 2/1938 | White et al. | 198/498 |
| 2,801,733 | 8/1957 | Evert | 198/498 |
| 2,886,169 | 5/1959 | Calder | 198/498 |
| 3,082,858 | 3/1963 | King | 198/840 |
| 3,236,568 | 2/1966 | Bombardier et al. | 198/498 |
| 3,626,773 | 12/1971 | Loeffler | 198/669 |
| 3,648,826 | 3/1972 | Brooks | 198/664 |
| 4,015,484 | 2/1976 | Taylor | 198/840 |
| 4,180,155 | 12/1979 | Stevick | 198/498 |

Primary Examiner—Joseph E. Valenza
Assistant Examiner—Michael Stone
Attorney, Agent, or Firm—Merchant, Gould, Smith, Edell, Welter & Schmidt

[57] ABSTRACT

A self-cleaning support for a conveyor belt having a shaft with first and second ends and a longitudinal center capable of being adapted to rotate at each of the ends. The shaft is provided with a first flighting to convey material from a first point proximate the longitudinal center toward the first end and a second flight to convey material from a second point proximate the longitudinal center towards the second end, with the first and second points being spaced apart. Two annular members are mounted at the first and second points respectively both encircling the shaft and defining axial openings permitting material to pass through to their respective flights. These annular members may provide a guide for the underside of the belt by being spaced apart to receive the width of a belt guide.

12 Claims, 3 Drawing Figures

SELF-CLEANING SUPPORT ROLLER FOR AN ENDLESS CONVEYOR BELT

TECHNICAL FIELD

The invention is directed to a self-cleaning support roller for an endless conveyor belt.

BACKGROUND OF THE INVENTION

Endless belt-type conveyors are used in a variety of applications to move various types of goods and articles from one point to another. They are particularly useful in the agricultural context because of their capability of conveying farm products of different sizes and configurations without damage.

One problem that has arisen, however, in conveying farm products is the incidence of dirt and the like that is carried along with the product prior to processing. The endless conveyor is conventionally driven at one point and requires idler support at various points over its length, and the presence of foreign material, such as the conveyed product or dirt or mud has an adverse effect on the idler supports, particularly in wet conditions when the foreign material turns to mud. Under these circumstances, the mud builds up on the idler rollers and in the guides intended to keep the belt tracking straight and increases their effective diameters. When this occurs with each of a number of idler rollers, particularly where the roller is positioned where the conveyor belt changes direction, the overall length of the travel path for the conveyor belt increases. As a result, the conveyor belt is forced to stretch, creating an inherent weakness that often leads to malfunction and belt or roller breakage. Another cause of failure is that the foreign material may build up unevenly on the rollers and cause their effective diameter to increase unevenly. When this occurs, the conveyor belt is forced to track laterally from its proper line of movement. As a result, there is excessive wear on the edge of the belt and the ends of the belt lacing by the sides of the conveyor frame, creating a weakness that leads to ripping or tearing of the belt, and causing undue wear on the sides of the conveyor frame. Problems of such magnitude result in difficult and expensive repairs, and in any case create significant downtime in the conveying operation.

SUMMARY OF THE INVENTION

Our invention is the result of an endeavor to overcome the problem of dirt and mud buildup on conveyor belt rollers and centering guides.

The inventive idler roller comprises a shaft having a length that generally corresponds to the width of the conveyor belt, and which is adapted to be mounted at each end for rotation about its longitudinal axis.

First and second flighting means are secured to the shaft, each extending from an inner point slightly offset from center to an outer point proximate the end of the shaft. The first and second flighting means have left and right hand pitches, respectively, and are disposed on the shaft to convey material outward from the center. In the preferred embodiment, each of the flighting means comprises first and second flights which are alternately and equidistantly disposed.

The inner points of the flighting means are spaced apart an amount which defines a free area. This free area directly underlies a continuous guide member of substantially the same width which is secured to the undersurface of the conveyor belt.

Ring members having the same effective outside diameter as the flighting means are secured to the flighting means at each of the inner points. These rings are spaced apart an amount that corresponds directly to the width of the continuous guide member of the belt, and the guide member projects therebetween in continuous guided relation.

Because the ring members are annular in configuration, they define longitudinal openings with the respective flighting means permitting the passage of dirt, mud and other material from the central area on the shaft to the respective flighting means.

As constructed, the inventive self-cleaning support roller offers stable support to the conveyor belt, and at the same time the flighting serves to continuously clean the undersurface of the belt. The ring members offer continuous guiding support to the guided member, thus preventing the conveyor belt from tracking laterally from its proper line of movement. In addition, any dirt, mud or other matter that drops between the ring members can pass longitudinally outward through the ring members to be picked up by the respective flighting means. As such, the self-cleaning support roller is capable of clean, continuous conveyor belt support for extended periods of time with very little maintenance.

DETAILED DESCRIPTION OF THE INVENTION

Figure 3:
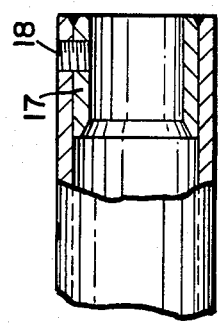
FIG. 3 is an enlarged fragmentary sectional view of one end of the support roller.

With reference to the figures, a self-cleaning support roller is represented generally by the numeral 11. Roller 11 is designed to provide idling support to a conveyor belt 12 that is represented generally by the numeral 12.

Conveyor belt 12 is conventional in nature, defining an endless loop and having an outer, material carrying surface 12a and an undersurface 12b. The physical and dimensional parameters of the conveyor belt 12, such as material, width and thickness, may vary with the specific application.

Conveyor belt 12 has a guide member 13 disposed at the midpoint of the undersurface 12b, extending over the entirety of the belt 12 in a continuous manner.

In the preferred embodiment, the conveyor belt 12 and guide 13 are rubber at least in part, the latter being vulcanized to the former. The guide 13 has a cross section taking the form of a truncated V, the narrower width of which is farthest from the undersurface 12b.

Self-cleaning support roller 11 comprises a tubular shaft 14 the length of which generally corresponds with the width of the conveyor belt 12.

Tubular shaft 14 is intended to rotate freely in idler fashion, and to achieve this purpose it receives a through shaft 15, and this shaft 15 is in turn carried by suitable bearings 16.

Figure 2:
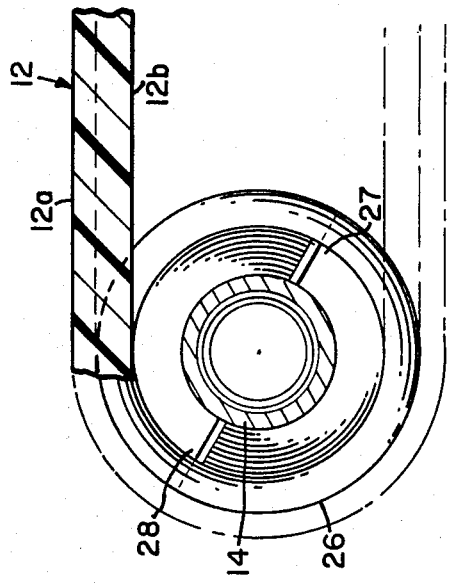
FIG. 2 is an enlarged sectional view of the self-cleaning support roller and conveyor belt taken along the line 2—2 of FIG. 1.

With reference to FIGS. 2 and 3, a short tubular bushing 17 having an outer diameter corresponding to the inner diameter of tubular shaft 14 slips into the tubular shaft 14 at each end and is welded in place. One or more setscrew openings 18 are drilled and tapped through the wall thicknesses at each end of the tubular shaft 14 and bushing 17, and appropriate setscrews (not shown) serve to lock the tubular shaft 14 onto the rotating through shaft 15.

Support roller 11 further comprises flighting which serves to convey material from the center area of tubular shaft 14 outward to its left and right ends. In the preferred embodiment, this flighting is configured in left-hand and right-hand sections. The left-hand section comprises first and second helical flights 21, 23 which alternate and are spaced equidistantly to define a double left-hand thread. The right-hand section similarly consists of alternating flights 22, 24 that are equidistantly spaced, and together define a double right-hand thread.

The left-hand flights 21, 23 and right-hand flights 22, 24 do not begin at the longitudinal center of the tubular shaft 14. Rather, they respectively begin slightly outboard of the longitudinal center of tubular shaft 14, which is represented by the section line 2—2 in FIG. 1. From this slightly off-center point, the flights 21, 23 extend to a point just short of the left end of tubular shaft 14, and the flights 22, 24 end at a similar point at the right end of tubular shaft 14.

The innermost ends (or beginning points) of the flights 21, 23 and 22, 24 are spaced apart by a distance which approximates the width of the continuous guide member 13 of conveyor belt 12 plus the width of rings 25, 26.

Figure 1:
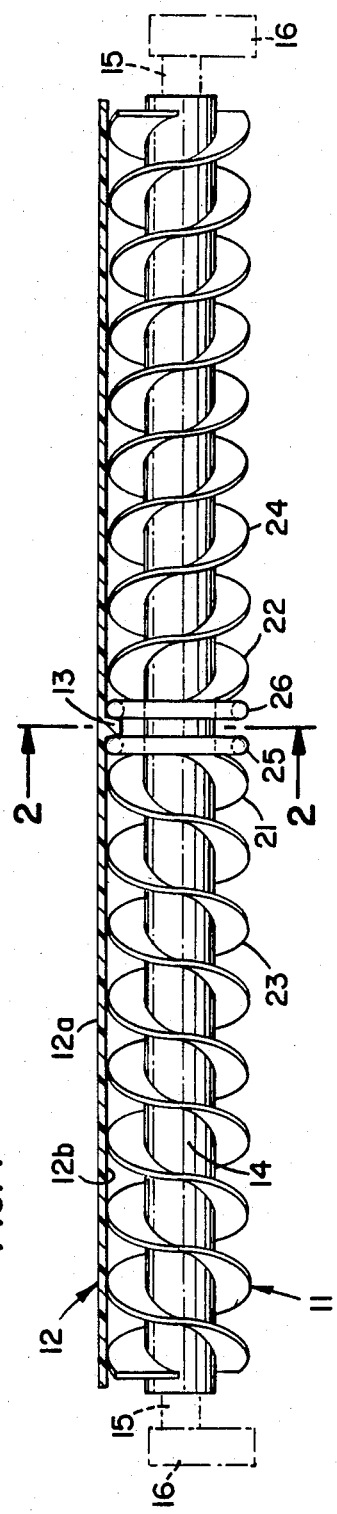
FIG. 1 is a view in side elevation of a self-cleaning support roller embodying the invention which is shown with a conveyor belt.

With reference to FIGS. 1 and 2, a ring 25 is secured to the flights 21, 23 at this beginning point, and an identical ring 26 is secured to the flights 22, 24 at their beginning points. Each of the rings 25, 26 is formed by rolling a solid circular rod on a round mandrel and welding the rod ends together.

As shown in FIGS. 1 and 2, each of the rings 25, 26 is disposed substantially perpendicularly to the longitudinal axis of the shaft 14. However, since the flights 21, 23 and 22, 24 spiral away from the rings 25, 26, contact between each of the rings and associated flights occurs only in two regions. The rings are welded to these two regions of contact on the associated flights, such weldments bearing the reference numerals 27, 28 in FIG. 2.

Because the weldments 27, 28 are diametrically opposed, each of the rings 25, 26 is given strong and stable support. However, it is also to be noticed that, because of the annular or toroidal nature of the rings 25, 26, any material which falls in the central area between the rings may pass longitudinally through the rings for engagement by either the flights 21, 23 or 22, 24, and will be conveyed longitudinally outward.

The distance between the rings 25, 26 corresponds directly to the width of the continuous guiding member 13, which is guidably received therebetween. This prevents the conveyor belt 12 from moving to the right or left of center as viewed in FIG. 1, thus insuring that the belt 12 tracks straight at all times.

It will also be observed from FIG. 1 that the outside diameter of all of the flighting 21-24 is the same, and also corresponds to the outside diameter of the rings 25, 26. In effect, this presents a roller of constant diameter to the undersurface 12b of conveyor belt 12, thus providing uniform support over the entire width of the belt 12 as it moves.

In addition, the flights 21-24 serve a self-cleaning function for the belt 12, continuously engaging and cleaning the undersurface 12b. This is highly beneficial because the conveyance of farm produce such as beans often is accompanied by dirt and other refuse. On conventional rollers, the foreign material often becomes mud and builds up on the roller, and in the conventional belt guide slots, if any, thus enlarging their diameters. This problem becomes severe if the diameter of the rollers is enlarged to the point of causing the conventional roller to break or the conveyor belt to stretch and break or track off center.

The inventive self-cleaning support roller assists in maintaining the undersurface 12b clean, and itself remains clean by conveying trapped dirt longitudinally outward to the left and right-hand ends of the roller for discharge onto the ground. The self-cleaning function is facilitated by the open area within each of the rings 25, 26, which insures that dirt and other material collected between the rings 25, 26 is conveyed longitudinally outward as well. As a result, the inventive self-cleaning support roller 11 will operate for extended periods of time without maintenance, even under dirty and muddy conditions.

What is claimed is:

1. A self-cleaning support roller for a conveyor belt the outer surface of which is adapted to convey material and the undersurface of which includes an elongated substantially continuous belt guide member of predetermined width, the support roller comprising:
    shaft means having first and second ends and adapted to be rotatably mounted at each of said ends;
    first flighting means on the shaft means extending toward the first end from a first point intermediate the first and second ends, the first flighting means being oriented to convey material from the central area of said shaft means toward said first end;
    second flighting means on the shaft means extending toward the second end from a second point intermediate the first and second ends, the second flighting means being oriented to convey material from the central area of the shaft means toward said second end;
    a first annular member disposed on the first flighting means at said first point in encircling relation to the shaft means, the first annular member being secured to the first flighting means and defining an opening therewith permitting material to pass therethrough;
    and a second annular member disposed on the second flighting means at said second point in encircling relation to the shaft means, the second annular member being secured to the second flighting means and defining an opening therewith permitting material to pass therethrough;
    the first and second annular members being spaced apart an amount corresponding to the width of said belt guide member and constructed and disposed to together receive and guide said belt guide member.

2. The support roller defined by claim 1, wherein the shaft means comprises an elongated shaft of substantially constant outside diameter.

3. The support roller defined by claim 1, wherein the first and second flighting means have an effective outside diameter that is substantially constant.

4. The support roller defined by claim 3, wherein the first and second annular members have outside diameters corresponding to the effective outside diameter of the first and second flighting means.

5. The apparatus defined by claim 1, wherein each of said first and second flighting means comprises a plurality of spiral flights.

6. The support roller defined by claim 5, wherein the plural flights of each flighting means are disposed alternately and equidistantly.

7. The support roller defined by claim 6, wherein each of said annular members is disposed substantially perpendicularly to the longitudinal axis of the shaft means.

8. The support roller defined by claim 7, wherein each of said annular members comprises a ring formed from a rod of circular cross section.

9. The support roller defined by claim 1, wherein the shaft means comprises an elongated tubular shaft of substantially constant outside diameter, and further comprising a bushing disposed within each of said first and second ends of the tubular shaft, the bushings constructed to receive a rotatable support shaft.

10. The support roller defined by claim 9, which further comprises setscrew means associated with each of said first and second ends of the tubular shaft and associated bushings for securing the support roller to said support shaft.

11. A self-cleaning support roller for a conveyor belt, comprising:
    shaft means having first and second ends and a longitudinal center, the shaft means being adapted to be rotatably mounted at each of said ends;
    first flighting means on the shaft means for conveying material from a first point proximate the longitudinal central area of the shaft means toward said first end;
    second flighting means on the shaft means for conveying material from a second point proximate the longitudinal central area of the shaft means toward said second end;
    said first and second points being spaced apart;
    a first annular member mounted at said first point in encircling relation to the shaft means, the first annular member defining an axial opening permitting material to pass therethrough to said first flighting means;
    and a second annular member mounted at said second point in encircling relation to the shaft means, the second annular member defining an axial opening permitting material to pass therethrough to said second flighting means.

12. In combination:
    a conveyor belt defining an outer surface adapted to convey material and an undersurface;
    substantially continuous guide means of predetermined width centrally disposed on the undersurface of said conveyor belt;
    and a self-cleaning support roller for the belt conveyor comprising:
        shaft means having first and second ends and a longitudinal center, the shaft means being adapted to be rotatably mounted at each of said ends;
        first flighting means on the shaft means for conveying material from a first point proximate the longitudinal central area of the shaft means toward said first end;
        second flighting means on the shaft means for conveying material from a second point proximate the longitudinal central area of the shaft means toward said second end;
        said first and second points being spaced apart in the longitudinal central area of said shaft means;
    and guiding means for guiding said guided means and comprising first and second members respectively disposed at said first and second points in encircling relation to the guide means, the first and second members being spaced apart an amount substantially corresponding to the width of the guiding means, and each being formed with axial opening means permitting the flow of material therethrough to the associated flighting means.

* * * * *